US006406216B1

(12) United States Patent
Raasch

(10) Patent No.: US 6,406,216 B1
(45) Date of Patent: Jun. 18, 2002

(54) STORM SEWER OVERFLOW CONTROL DEVICE

(76) Inventor: Jason J. Raasch, 2111 N. Burke Dr., Arlington Heights, IL (US) 60004

( * ) Notice: Subject to any disclaimer, the term of this patent is extended or adjusted under 35 U.S.C. 154(b) by 0 days.

(21) Appl. No.: 09/611,874

(22) Filed: Jul. 7, 2000

(51) Int. Cl.[7] ............................ E01C 4/22; F15C 1/16; F16L 5/02

(52) U.S. Cl. ............................ 404/2; 405/40; 403/371; 285/216; 285/346; 137/808; 137/812; 277/603; 277/607; 277/626; 277/647; 251/300

(58) Field of Search ............................ 138/37; 404/2, 404/4; 405/40; 403/371; 220/237; 285/216, 346, 323; 137/808, 812, 810, 813; 277/603, 605, 607, 626, 627, 645, 647; 251/294, 300

(56) References Cited

U.S. PATENT DOCUMENTS

| | | | | | |
|---|---|---|---|---|---|
| 601,794 | A | | 4/1898 | Hershberger | |
| 712,194 | A | | 10/1902 | Kelly | |
| 1,347,880 | A | | 7/1920 | Whittaker | |
| 1,525,136 | A | | 2/1925 | Kopke | |
| 1,713,775 | A | | 5/1929 | Moody | |
| 1,905,919 | A | | 4/1933 | Kevis | |
| 3,173,699 | A | * | 3/1965 | Nathan | 277/615 |
| 3,521,657 | A | * | 7/1970 | Ayers | 137/813 |
| 3,613,936 | A | | 10/1971 | Kaiser et al. | |
| 3,712,631 | A | * | 1/1973 | Forchini et al. | 277/207 |
| 3,815,748 | A | | 6/1974 | Johannessen | |
| 4,170,365 | A | * | 10/1979 | Haaland | 277/207 A |
| 4,206,783 | A | * | 6/1980 | Brombach | 137/810 |
| 4,213,619 | A | * | 7/1980 | Arlt et al. | 277/207 A |
| 4,259,988 | A | * | 4/1981 | Singh | 137/812 |
| 4,333,499 | A | * | 6/1982 | Beck et al. | 137/812 |
| 4,426,095 | A | * | 1/1984 | Buttner | 277/207 A |
| 4,679,595 | A | * | 7/1987 | Johannessen | 137/813 |
| 4,690,414 | A | * | 9/1987 | Haaland | 277/207 A |
| 4,712,811 | A | | 12/1987 | Wier | |
| 4,889,166 | A | * | 12/1989 | Lakatos | 137/813 |
| 4,982,529 | A | * | 1/1991 | Mesnel | 49/491 |
| 5,080,137 | A | * | 1/1992 | Adams | 137/810 |
| 5,114,162 | A | * | 5/1992 | Ditcher | 277/207 A |
| 5,257,791 | A | * | 11/1993 | Cittadini et al. | 277/80 |
| 5,501,472 | A | * | 3/1996 | Brancher et al. | 277/178 |
| 5,640,988 | A | * | 6/1997 | Brereton | 137/14 |
| 6,082,925 | A | | 7/2000 | Raasch | |

OTHER PUBLICATIONS

Specification No. B0–81573–01 entitled Sewer Line Intake Flow Restrictor Valves, City of Chicago, Feb. 8, 2000.

* cited by examiner

*Primary Examiner*—Gary S. Hartmann
(74) *Attorney, Agent, or Firm*—Greer, Burns & Crain, LTD.

(57) ABSTRACT

A storm sewer overflow control device for controlling runoff surge flows from a generally vertically oriented storm drain into a generally horizontally oriented storm sewer pipe includes an engagement portion configured for insertion into the storm sewer pipe, a flow control portion attachable to the engagement portion and configured for receiving runoff surge flow flowing down the storm drain and slowing the flow for entry into the storm sewer through the engagement portion. The engagement portion is radially expandable to tightly and frictionally engage an interior surface of the storm sewer pipe, and preferably is configured to expand radially as it is shortened axially.

28 Claims, 9 Drawing Sheets

STORM SEWER OVERFLOW CONTROL DEVICE

BACKGROUND OF THE INVENTION

The present invention relates generally to flood control devices for controlling storm-generated runoff water, and specifically to a storm sewer overflow device for controlling storm or flood generated surges of runoff flow into storm sewers.

Conventional municipal flood control systems include storm sewer mains placed parallel to the roads, with individual residential, multi-family or commercial branch lines feeding into the mains. The branch lines and mains are generally horizontally oriented in the ground, and are pitched or inclined a specified amount to facilitate water flow from one location to another. Storm drains are periodically placed along the sides of the roads, and the roads are graded to direct water into these drains. The drains are generally vertically oriented, and are in fluid communication with the mains, and possibly also with branch lines.

During or after heavy rains and/or rapid snow melt, substantial amounts of water are directed into the drains and ultimately into the mains. In some cases, the incoming water volume is greater than the capacity of the mains, and the water, seeking the point of least resistance, may saturate the main line first, not allowing for residential branch lines to drain. This back flow is a major cause of residential flooding. In localities where the sewage sewers and the drain sewers are combined, the backflow may create potentially hazardous health consequences for the flooded residences.

Accordingly, efforts have been made to slow the flow of incoming water to the drains to a rate which can be accommodated by the mains without causing backflow. One such device operates on a vortex principle, when placed in the storm drain. A typical vortex device is made of stainless steel and includes a horizontal portion configured for engaging the main, and a flow control portion configured for receiving the incoming flow and creating a vortex for restricting the amount of water which enters the main through the horizontal portion. In this manner, the vortex device delays the entry of water into the horizontal portion, so that the sewers can accommodate the water without backing up the residential or feed sewer lines.

Conventional vortex devices are provided in various sizes to match main pipe diameters known in the industry. Installation is effected by forcing the horizontal portion into the end of the main which communicates with the storm drain, and employing a hydraulic ram to force a sealing friction fit between the horizontal portion and the inside surface of the main.

This procedure is acceptable in areas where the pipes are relatively new and in good condition. However, in established areas with aged plumbing systems, the pipes become misshapen and/or corroded with age. In areas with clay pipes, the pipes often become oval in shape with age and leaks due to cracking are widespread. The act of forcing the conventional vortex device into fragile, corroded and/or misshapen pipes often causes the pipes to collapse or to be otherwise unacceptable for use. Also, conventional vortex devices are hand fabricated, resulting in significant dimensional deviations. Such deviations in many cases make it difficult to fit vortex devices into pipes.

In situations where the installation of a vortex device causes the pipes to collapse or become otherwise damaged, the area immediately surrounding the installation must be excavated so that a new pipe end may be installed which can accommodate the vortex device. As will be appreciated, this is a time consuming and expensive procedure.

Even when the conventional vortex devices are properly installed and under favorable conditions, the units are heavy due to their stainless steel construction, and difficult to manipulate in the often cramped working conditions of storm drains. Also, conventional vortex devices cannot be removed to clear trapped debris without removing the entire unit. This also requires heavy equipment and often leads to damage or destruction of the pipe in the immediate area.

Thus, there is a need for an improved vortex device which is more easily installed into a variety of operational applications and pipe conditions without damaging or destroying the pipe. There is also a need for such a device which can be removed from the pipe for cleaning or pipe repair without damaging or destroying the pipe.

Accordingly, a first object of the present invention is to provide an improved storm sewer overflow control device which is configured to tightly and securely fit in a variety of pipe diameters and conditions.

Another object of the present invention is to provide an improved storm sewer overflow control device which is installable without the use of heavy equipment.

Still another object of the present invention is to provide an improved storm sewer overflow control device which is easy to remove for the clearing of debris or for pipe repair purposes.

Yet another object of the present invention is to provide an improved storm sewer overflow control device which is lightweight and easily manipulable in storm drains.

A further object of the present invention is to provide an improved storm sewer overflow control device which adequately and/or selectively restricts the incoming flow of flood water to prevent the overloading of sewer mains.

SUMMARY OF THE INVENTION

The above-listed objects are met or exceeded by the present storm sewer overflow control device. The purpose of the present unit is to slow the drainage from the street sewer, keeping water on the street longer and giving priority to the residential branch lines until the rain slows down. A first advantage of the present device is that it can be installed in sewer pipes having a variety of dimensions, shapes and conditions. Also, the present device is easy to install or remove from sealing engagement with the pipe using simple hand tools, and in difficult working conditions, namely in the storm drain itself. The use of polymeric materials makes the present device resistant to corrosion, lightweight to handle, inexpensive to produce and affords the capability for mass production, thus resulting in uniform dimensions compared to conventional overflow control devices.

More specifically, a storm sewer overflow control device is provided for controlling runoff surge flows from a first pipe into a generally normally oriented second pipe. The device includes an engagement portion configured for insertion into the second pipe, a flow control portion attachable to the engagement portion and configured for receiving runoff surge flow flowing down the storm drain and slowing the flow for entry into the second pipe through said engagement portion. The engagement portion is radially expandable to engage an interior surface of the second pipe for creating a tight friction fit.

In the preferred embodiment, the engagement portion is configured with at least one component which expands radially as desired to tightly engage the corresponding inner wall of a target pipe. In one embodiment, the expansion is created by axial shortening of the engagement portion. In another embodiment, components of the engagement portion are moved axially to create the radial expansion. In a preferred embodiment, the radial expansion is obtained through the controlled movement of a wedge ring against radially expandable slats. It is also preferred to circumscribe the slats with at least one compressible annular member such as an O-ring or a quad ring. Such an annular member provides a tight frictional relationship against the inside of the pipe. The annular member is compressed against the inside of the pipe by the radially expanding engagement portion, and is prevented from slipping off the fingers by a cone-shaped wedge ring at a distal end of the engagement portion. Once installed, the harder the present device is pulled axially from the sewer mouth, the tighter is the locking action, since the annular member "walks up" the wedge ring, thus increasing its diameter in an opposite direction from the typical tightening direction. Another annular member is preferably provided near the junction of the flow control portion and the horizontal portion, to seal the entry to the pipe and by preventing water from entering the pipe by bypassing the flow control portion. An optional feature is a restrictor disk installable in the device to control the velocity of water flowing into the sewer main.

DETAILED DESCRIPTION OF THE PREFERRED EMBODIMENT

Figure 1:
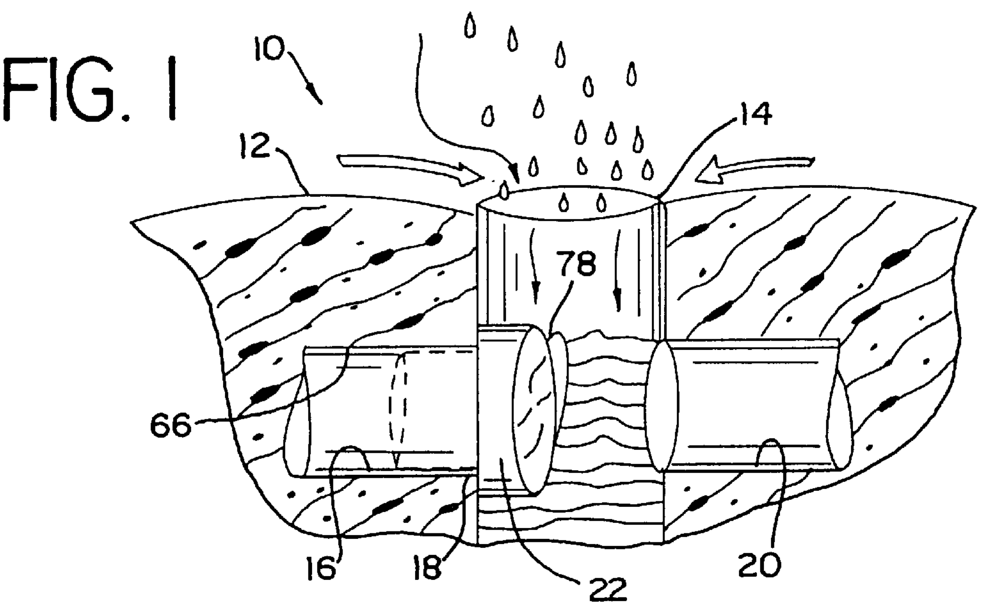
FIG. 1 is a schematic view of a storm water plumbing system, including a storm drain, several storm sewers, and the present storm sewer overflow control device.

Referring now to FIG. 1, a conventional storm water plumbing system is schematically depicted and generally designated 10. The system 10, typically placed underground adjacent a road 12, includes at least one generally vertically disposed storm drain 14 which is typically provided with an apertured manhole cover (not shown). At least one generally horizontally oriented storm sewer main 16 has an end 18 in fluid communication with the storm drain 14 as is known in the art. In some cases, residential or commercial storm sewer branch lines 20 may also be in fluid communication with the storm drain 14. The present storm sewer overflow control device, generally designated 22, is shown operationally disposed in the end 18 of the storm sewer main 16. It will be appreciated that the present device 22 is designed to be used wherever fluid velocity reduction is desired when fluid flows from a first pipe to a generally normally oriented second pipe.

Figure 2:
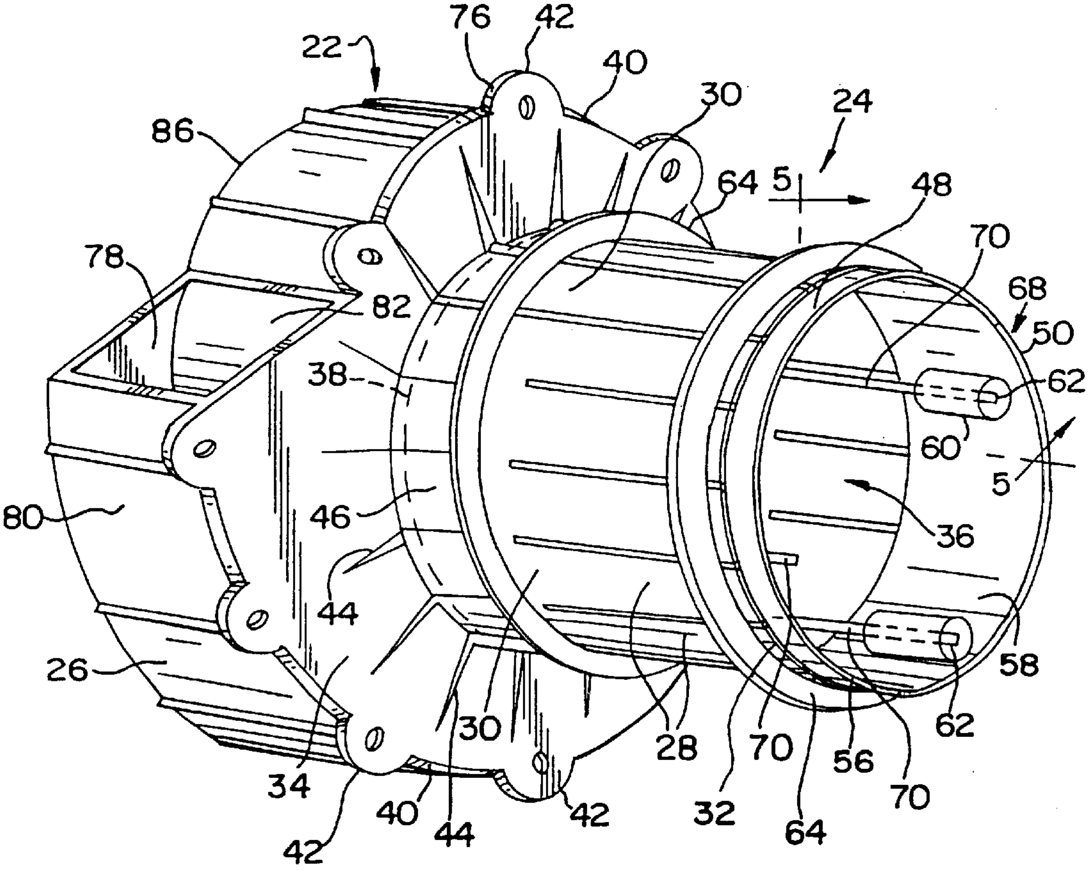
FIG. 2 is a rear perspective elevational view of a first embodiment of the present storm sewer overflow control device.
Figure 3:
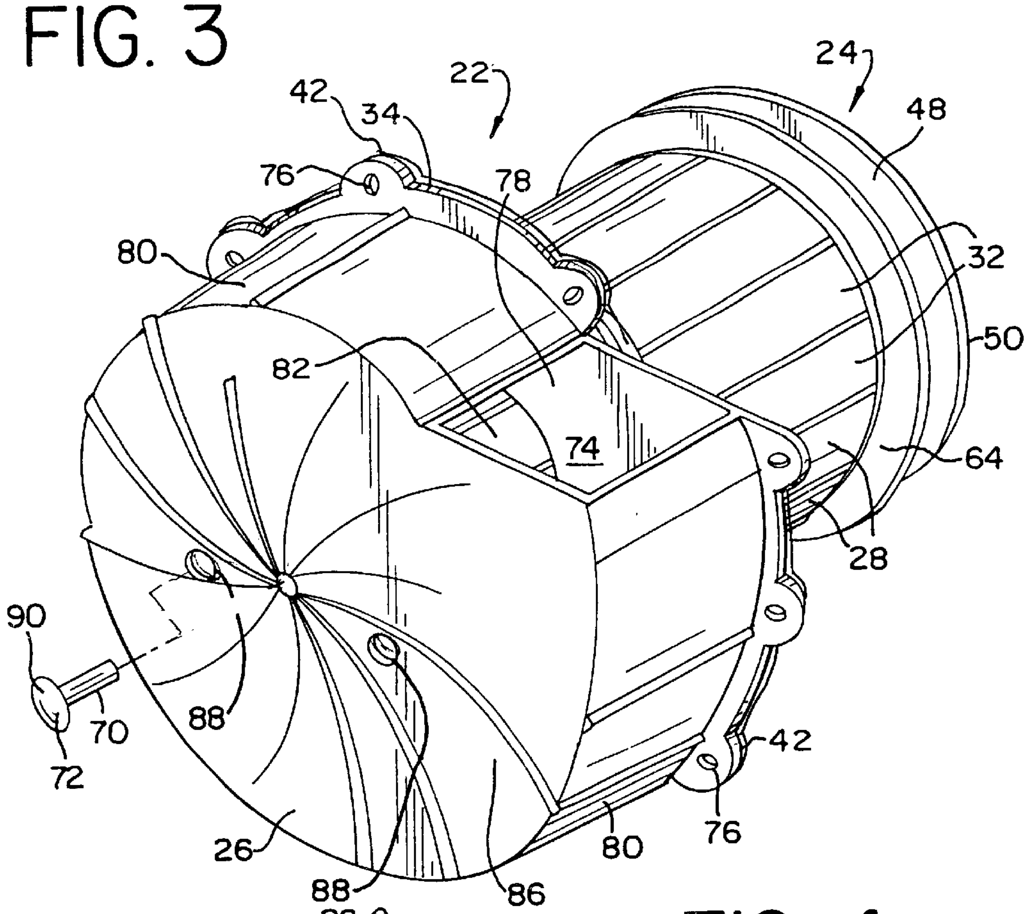
FIG. 3 is a front perspective elevational view of the device of FIG. 2.

Referring now to FIGS. 2 and 3, the storm sewer overflow control device 22 principally includes an engagement portion 24 configured for insertion into the pipe 16, and a flow control portion 26 which is attachable to the engagement portion 24 and is configured for receiving runoff surge flow flowing down the storm drain 14 and slowing the flow for entry into the storm sewer 16 through the engagement portion.

In the preferred embodiment, the engagement portion 24 includes a plurality of annularly spaced, generally parallel slats 28, each having a proximal end 30 closer to the flow control portion 26 and the storm drain 14, and a distal end 32 extending down into the sewer pipe 16. For ease of manufacturing, it is preferable that each slat is virtually identical, and has a length and a thickness which can vary with the application, however a length in the range of 8 to 12 inches is preferred.

The proximal ends 30 are each joined to a radially extending flange 34 which is oriented relative to the slats preferably at an approximate 90° angle, and the preferably annular arrangement of the slats 28 defines a generally circular passageway 36. An opening 38 (shown hidden) in the flange 34 is in fluid communication with the passageway 36. The diameter of the opening 38 may vary to suit the application, and will preferably be smaller than the diameter of the passageway 36. In the preferred embodiment, the flange 34 and the slats 28 are integrally fabricated from a durable polymeric material known for its strength, environmental durability, chemical resistance, and water resistance. An example of such a material is acrylo-butadiene-styrene (ABS), however other known equivalent materials are also contemplated.

Figure 6:
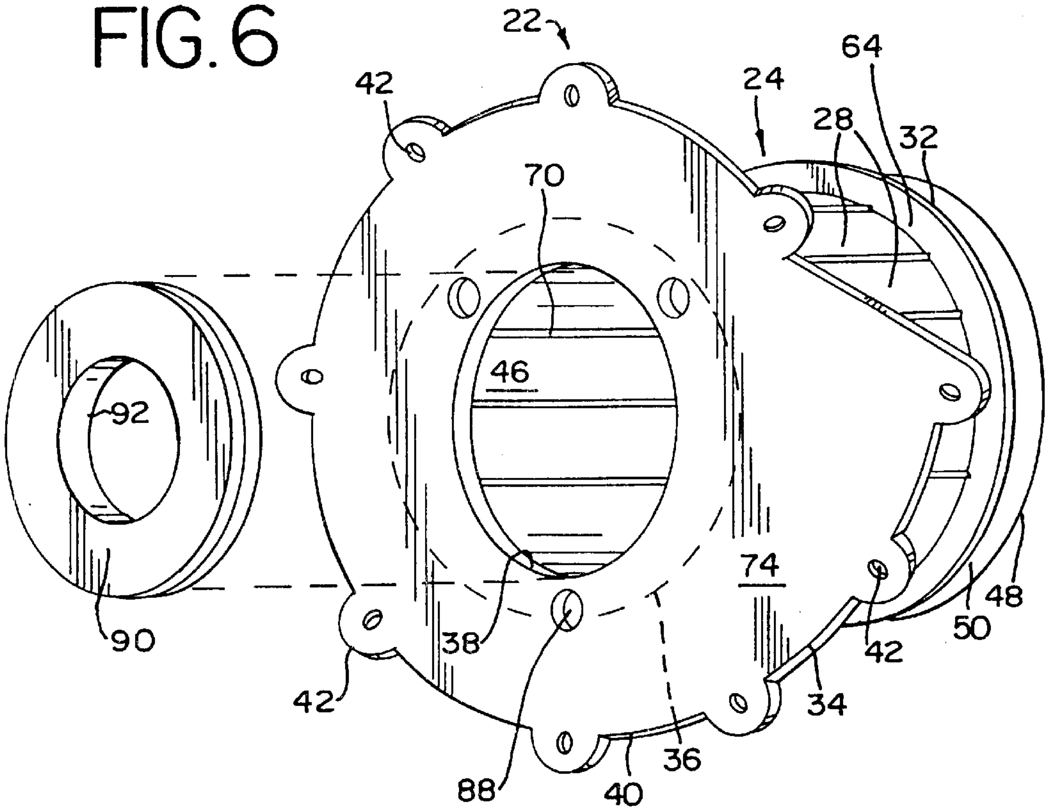
FIG. 6 is a front elevational view of a first embodiment of the present device with the cowl removed.

A peripheral edge 40 of the flange 34 is provided with a plurality of eyelets 42. Also, in the preferred embodiment a plurality of support gussets 44 are provided at the junction of the proximal ends 30 and the flange 34 for added structural strength. In the preferred embodiment, the slats 28 are separated along their entire lengths, however it is contemplated that they may be joined together by a solid and optionally potentially relatively thickened band 46 (shown partially in FIGS. 2 and 6) for added structural support.

Figure 5:
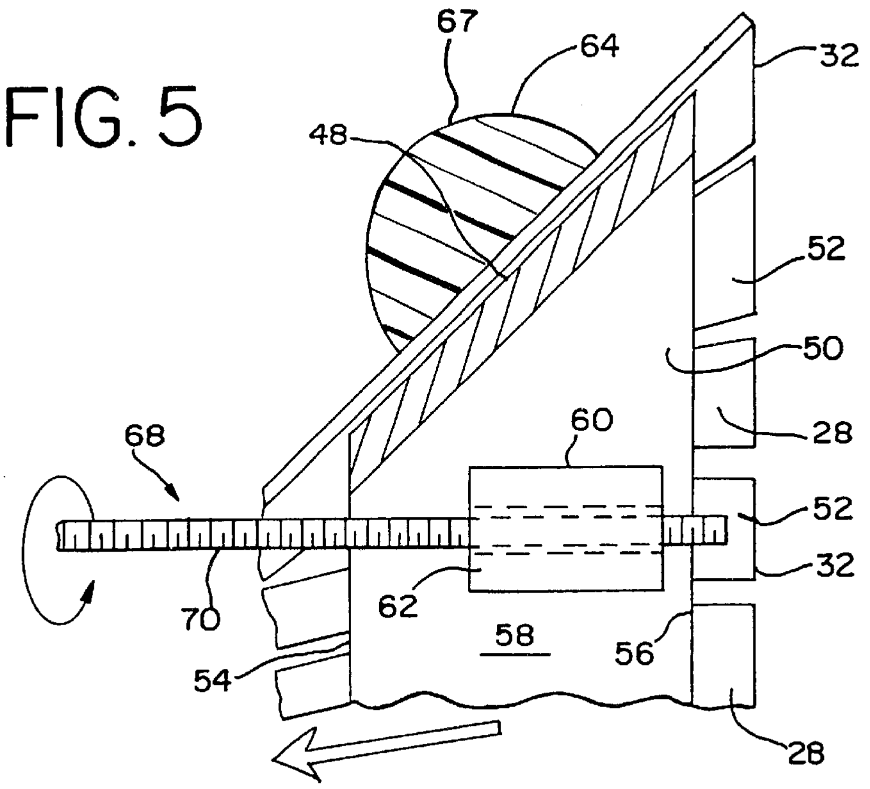
FIG. 5 is a sectional view taken along the line 5—5 of FIG. 2 and in the direction generally indicated.

Referring now to FIGS. 2, 3 and 5, opposite the proximal ends 30, the distal ends 32 are free, and engage an inclined or ramped surface 48 of a generally frusto-conical wedge ring 50, which is oriented to contact inside surfaces 52 of each of the slats 28. In size, the wedge ring 50 has a first outside diameter 54 which approximates the diameter of the passageway 36, and which is oriented toward the flange 34. A second, larger diameter 56 is at the outer edge of the inclined surface 48, and defines the degree of incline when a straight line connects the respective diameters 54, 56. The second diameter 56 faces away from the flange 34.

An inside surface 58 of the wedge ring 50 has at least one and preferably two bosses 60 secured to the surface 58 and having threaded bores 62. Additional bosses 60 are contemplated depending on the application. In the preferred embodiment, the wedge ring 50 is made of the same or a similar material as the flange 34, and the bosses 62 are integrally molded with the ring. Also, while shown as solid, the wedge ring 50 may be constructed with hollowed out portions to conserve material without sacrificing strength, as is well known in the art.

At least one and preferably two annular resilient rings or seals 64 are provided to circumscribe the slats 28. In the illustrated embodiment, the rings 64 are O-rings, one ring 64 is disposed closer to the proximal end 30 or the flange 34, and the other is disposed closer to the distal end 32 or the wedge ring 50. However, it is also contemplated that the O-ring 64 closer to the distal end 32 can be a quad ring or similar noncircular shaped ring. It is preferred that the O-rings 64 are dimensioned so that upon placement about the slats 28, a tight gripping force is exerted by the rings against all of the slats, to the extent that the slats compress radially to a small extent as a result of this force. It is also preferred that the seal 64 located closer to the proximal end 30 will sealingly engage the mouth of the horizontal sewer main 16 or pipe into which the engagement portion 24 is inserted, so that water may not enter the main 16 by bypassing the device 22.

An important feature of the present storm sewer overflow control device 22 is that it is configured to be sealingly and/or tightly frictionally secured within a wide variety of pipe diameters and of pipes of varying conditions. This feature is achieved by making the engagement portion 24 expandable to engage an interior surface 66 (best seen in FIG. 1) of the sewer pipe 16. More specifically, the engagement portion 24 is radially expandable to create a friction fit against the interior surface 66 of the pipe for retaining the engagement portion in the pipe. In some cases, the engagement portion will sealingly engage the interior pipe surface 66 so that water may not pass between the seal and the surface 66.

Referring now to FIGS. 2 and 5, in the preferred embodiment, this expansion is obtained through an expander mechanism, generally designated 68. Included in the expander mechanism 68 are the bosses 60 and a preferably corresponding number of threaded fasteners 70. While the fastener 70 is shown in FIG. 2 in shortened format for clarity, the fasteners are at least as long as the slats 28 and are disposed on the insides thereof to be threadably engaged in the bores 62. Preferably stainless steel, polymeric or other corrosion resistant material, the fasteners 70 may be bolts, screws, Allen heads, Torx or other known fastener designs. Also contemplated are elongated rods with offset locking cams. Heads 72 (FIG. 3) of the fasteners 70 are rotationally disposed, yet axially fixed on the opposite side of the flange 34 from the slats 28.

Rotation of the fasteners 70 in the bores 62 will draw the wedge ring 50 toward the flange 34. In so doing, the distal ends 32 of the slats 28 will be engaged by the inclined surface 48 and expanded radially to expand to tightly engage the inside surface 66 of the pipe 16. In other words, as the engagement portion 24 shortens axially, it expands radially.

Referring now to FIG. 5, it will be seen that the O-ring 64 located closer to the wedge ring 50 deforms at its lower edge 65 to conform to the surface of the inclined slats 32. Upon radial expansion of the engagement portion 24 against the inside surface 66 of the pipe 16, an outer edge 67 will also deform.

Referring now to FIGS. 2, 3, 4 and 6, turning now to the flow control portion 26 of the storm sewer overflow control device 22, the portion 26, also referred to as a cowl, is preferably configured to be fixed to the flange 34 on a side 74 opposite the slats 28. However, it is also contemplated that the cowl 26 may be releasably attachable to the flange 34. Accordingly, the cowl 26 has a like number of eyelets 76 which are dimensioned and configured to be in registry with the eyelets 42 on the flange 34. Upon orientation of the cowl 26 over the flange 34 so that the eyelets 42, 76 are in registry, preferably corrosion resistant fasteners (not shown) can be used to attach the two components. Any type of threaded or non-threaded fastener can be used to secure the eyelets together, as long as the cowl 26 is secured to the flange 34 in a watertight manner. If desired, opposing engaged edges of the flange 34 and the cowl 26 may be provided with a tongue-in-groove configuration or other type of gasket or seal relationship.

In configuration, the cowl 26 is designed to create a flow path for water attempting to enter the sewer pipe 16. An inlet 78 is disposed to receive water flowing down the storm drain 14, yet to restrict the volume of water which may enter the pipe 16. Further, the inlet 78 is oriented at an approximate 90° angle to the axis of the passageway 36 to reduce the velocity of the incoming water. In addition, a sidewall 80 of the cowl 26 has a portion 82 extending into the inlet 78 to act as a diverter vane.

Figure 4:
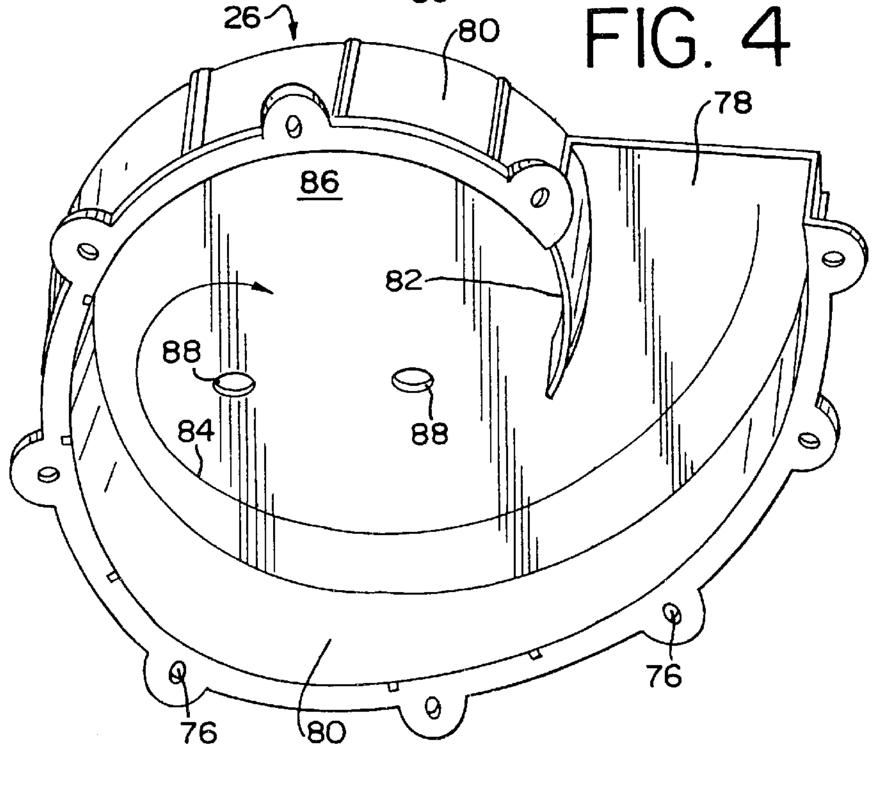
FIG. 4 is an elevational view of the inside of the cowl of the present device.

Referring now to FIG. 4, the diverter vane 82 and the generally circular shape of the sidewall 80 create a vortex-like flow path 84 which further reduces the velocity of the incoming water. A cover panel 86 further defines the flow path 84, which is in fluid communication with the passageway 36, and is preferably integrally formed with the sidewall 80. In the preferred embodiment, the cover panel 86 is provided with a number of fastener apertures 88 dimensioned and positioned to receive fastener heads located 72 at proximal ends of the fasteners 70. Thus, the heads 72 are accessible through the flow control portion 26.

To further control and reduce the velocity of water flowing into the passageway 36, the flange opening 38 may potentially have a smaller diameter than the passageway, to form a restriction in the flow path 84. It is contemplated that a supplemental restrictor disk 90 having an aperture 92 which is smaller in diameter than the opening 38 may be secured to the flange 34 to further restrict the flow velocity into the passageway 36. The restrictor disk 90 may be secured to the flange 34 using any known fastening technology, including threaded fasteners, chemical adhesives and/or ultrasonic welding. It is also contemplated that the disk 90 be configured as a replacement to the flange 34.

Referring now to FIGS. 7–10, an alternate embodiment of the device 22 is generally designated 100. Components shared with the device 22 are designated with identical reference numbers. One main difference between the devices 22, 100 is in the construction of the compressible resilient rings 64, which are also referred to as wedge members. In the device 100, the rings, designated 102 for the distal ring, and 104 for the proximal ring, have distinctive shapes and functions.

Figure 7:
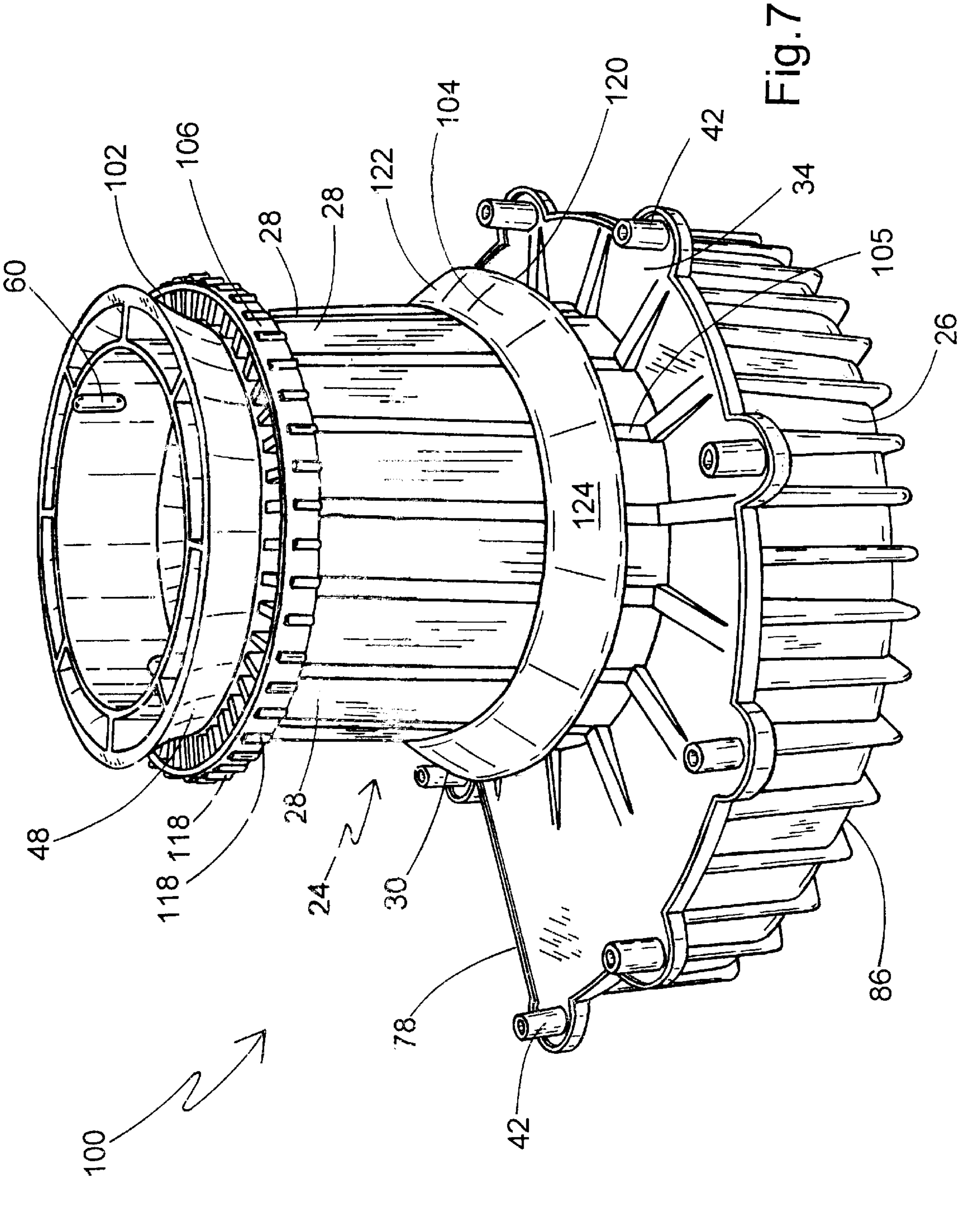
FIG. 7 is a perspective elevational view of an alternate embodiment of the present device.
Figure 8:
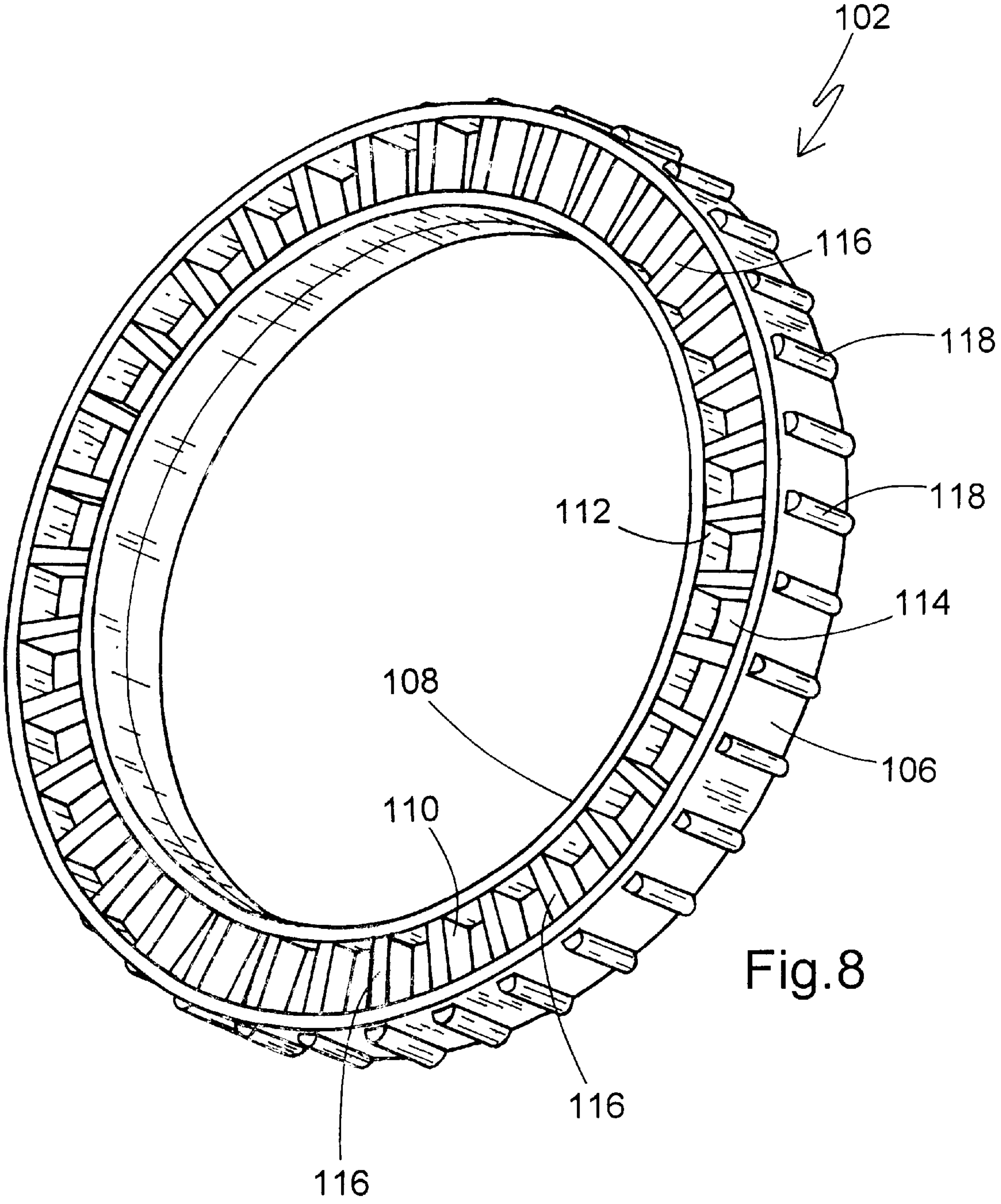
FIG. 8 is a perspective elevational view of a resilient ring of the type suitable for use with the present invention.

Referring now to FIGS. 7 and 8, the distal ring 102 is a compressible ring having at least one flat side for engaging the engagement portion 24. The purpose of this ring is the same as that of the distal ring 64 in the device 22, i.e., to provide a tight friction fit between the engagement portion 24 and the inner surface 66 of the pipe 16 to retain the device 100 inside the pipe 16. In some cases, a water-tight seal will be achieved between the ring 102 and the pipe 16, but that is not required.

The flat-sided configuration of the ring 102 is preferred since it prevents the ring from creeping along the engagement portion 24 during the engagement process. In the preferred embodiment, the ring 102 includes a pair of radially spaced, upper and lower generally flat band-like portions 106, 108. The upper portion 106 engages the inside surface 66 of the pipe 16, and the lower portion 108 engages the engagement portion 24, specifically so as to circumscribe the slats 28. The relatively flat configuration of the upper and lower portions 106, 108 facilitates gripping and prevents unwanted movement of the ring 102 relative to the engagement portion 24.

It is also preferred that the radially spaced relationship of the bands 106, 108 is maintained by a honeycomb portion 110. In the preferred embodiment, the honeycomb portion is made of a plurality of adjacent box-like cells 112 with closed rear walls 114 and adjacent cells are defined by radially projecting ribs 116. The ribs 116 generally extend between the upper and lower bands 106, 108. It is also preferred that the ring 102 be provided with a plurality of peripherally spaced, radially projecting gripping formations 118 which facilitate a positive grip when the inside surface 66 of the pipe 16 is uneven, and provides additional compressibility when the engagement portion is radially expanded.

In the preferred embodiment, the ring 102 is integrally formed, as by injection molding, and the material is a rubber-like composition such as buna-N rubber or PVC. However other compositions of compressible, water-resistant and environmentally-resistant materials are contemplated.

Figure 9:
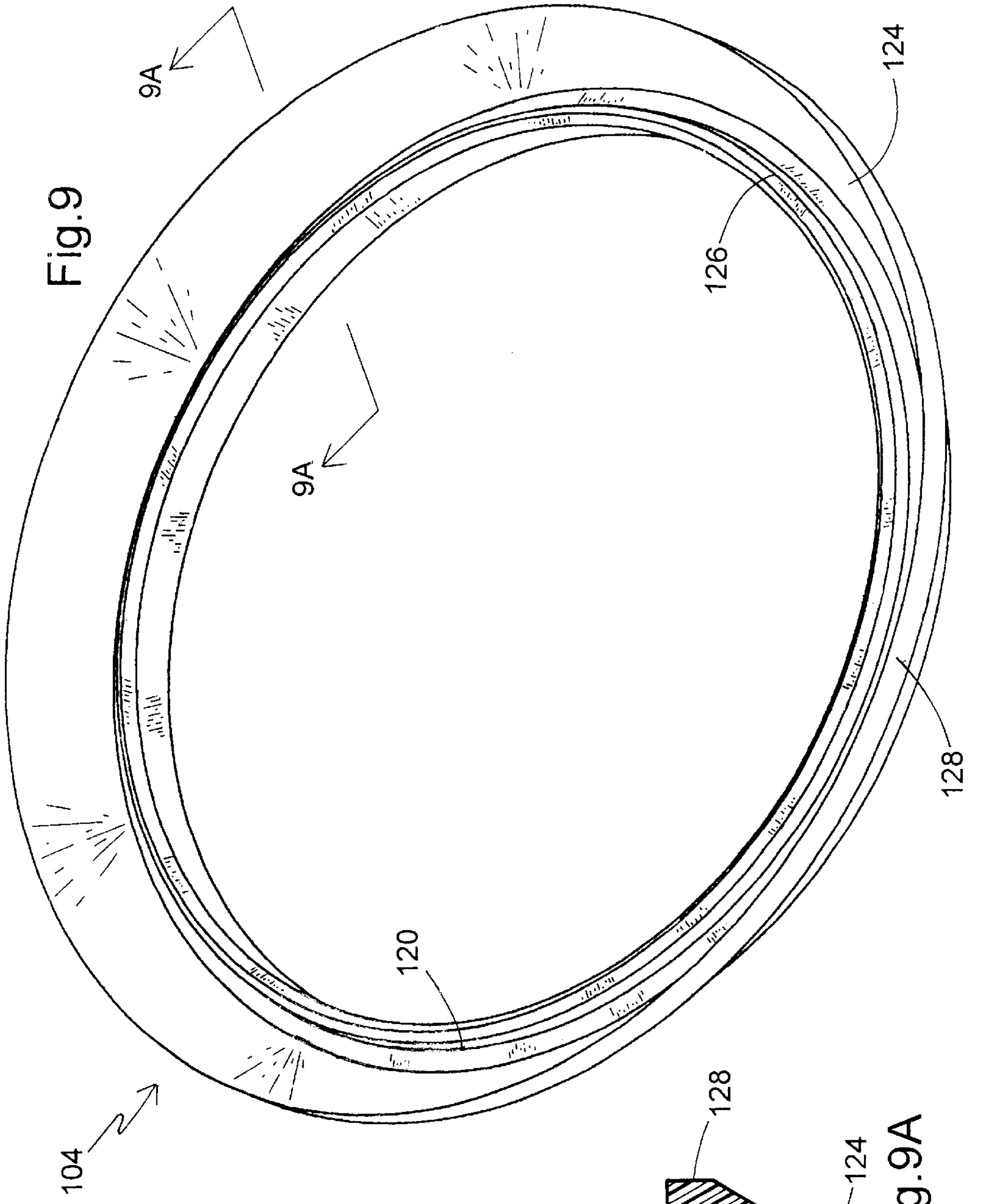
FIG. 9 is a top perspective elevational view of a V-seal of the type suitable for use with the present device.
Figure 9A:
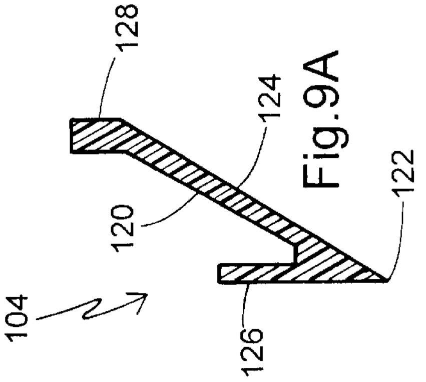
FIG. 9A is a sectional view taken along the line 9A—9A of FIG. 9 in the direction generally indicated.

Referring now to FIGS. 7, 9 and 9A the proximal ring 104 is preferably made of the same material as the ring 102, and is preferably disposed between the flange 34 and the proximal ends 30 of the slats 28. As seen in FIG. 7, the engagement portion 24 may be provided with support ribs 105 which form a locating stop for the ring 104. These support ribs 105 help ensure a sealing engagement of the device 100 in the pipe 16. The main purpose of the ring 104 is to prevent water from bypassing the flow control portion 26 and entering the pipe 16 to cause flooding without being delayed. In other words, the ring 104 creates a water-tight seal between the device 100 and the pipe 16.

In the preferred embodiment, the ring 104 is configured as a V-seal having an open end 120 and an opposite pointed end 122. Upon assembly of the ring to the device 100, the pointed end 122 is directed toward the distal end 32. More specifically, the ring 104 includes an angled outer wall 124 which engages the sewer pipe 16, and an inner wall 126 which is oriented generally parallel to an axis of the engagement portion 24 and engages the device 100, preferably by circumscribing the device between the flange 34 and the slats 28. The inner and outer walls 126, 124 intersect at the pointed end 122. In addition, the outer wall 124 has a peripheral edge portion 128 which is generally parallel with the axis of the engagement portion 24. This orientation of the edge portion 128 assists in the sealing engagement of the ring 104 with the mouth of the pipe 16. The design is such that, at the open end 120, due to its shape, in coming water actually exerts sufficient pressure against the seal to increase its sealing properties. In addition, the flared or conical orientation of the outer w all 124 enables the device 100 to sealingly engage pipes of slightly noncircular circumference, as occurs to such pipes through age, settling and/or corrosion.

Referring now t o FIGS. 10–13, a second alternate embodiment of the present device is generally designated 130. Components shared with the devices 22 and 10 are designated with identical reference numbers. A main distinguishing feature of the device 130 is the manner in which the engagement portion 132 radially expands to securely engage the inner surface 66 of the pipe 16.

Instead of being relatively cylindrical, as is the engagement portion 24, the engagement portion 132 is frustoconical or tapered toward the distal end 32. This tapered configuration facilitates insertion of the device 130 into the pipe. The slats 28 are replaced by a generally tubular body 134 having a plurality of elongate slots 136. In the preferred embodiment, these slots 136 open at the distal end 30. The ring 104 is provided as a V-seal as in the device 100. However, the distal ring 102 (also referred to as a wedge member) is provided as an O-ring which is configured for rolling or sliding action toward the proximal end 30 of the device 130.

Figure 12:
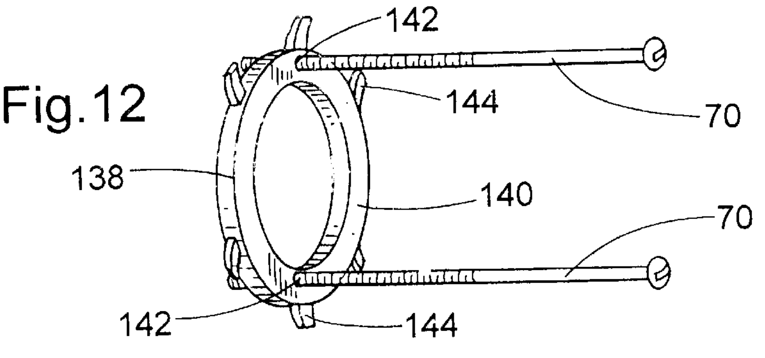
FIG. 12 is a perspective elevational view of a spider for use with the device of FIGS. 10 and 11.

Referring now to FIG. 12, a spider member 138 preferably includes a ring 140 dimensioned to reciprocally linearly move within the tubular body 134. Further, the ring 140 is open in the center to facilitate the flow of water therethrough, and not provide an obstruction. As such, the ring 140 is configured to suit the diameter of the tubular body 134. A plurality of tapped bores 142 is provided for receiving the ends of the fasteners 70. The spider member 138 may be made of any rigid, environmentally resistant material, such as ABS or equivalent.

In addition, a plurality of radially extending fingers 144 are constructed and arranged on the ring 140 to matingly and slidingly engage the corresponding slots 136. The number and size of the slots 136 and fingers 144 may vary to suit the application, as long as there are enough to engage an O-ring 64, 102 and push it toward the proximal end 30 as described below. It will be appreciated that the fingers 144 must be tall enough to engage the O-ring 64, 102 as it progresses up the widening tubular body 134, while not being too tall to contact the inner surface 66 of the pipe 16.

Figure 10:
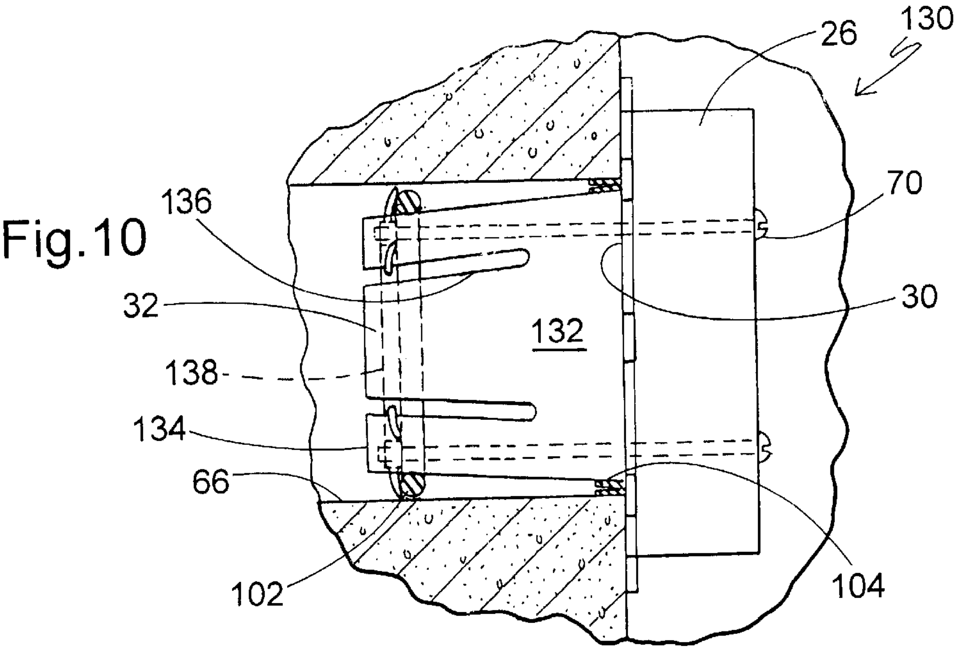
FIG. 10 is a side elevational view of a second alternate embodiment of the present device, shown in an inserted position.
Figure 11:
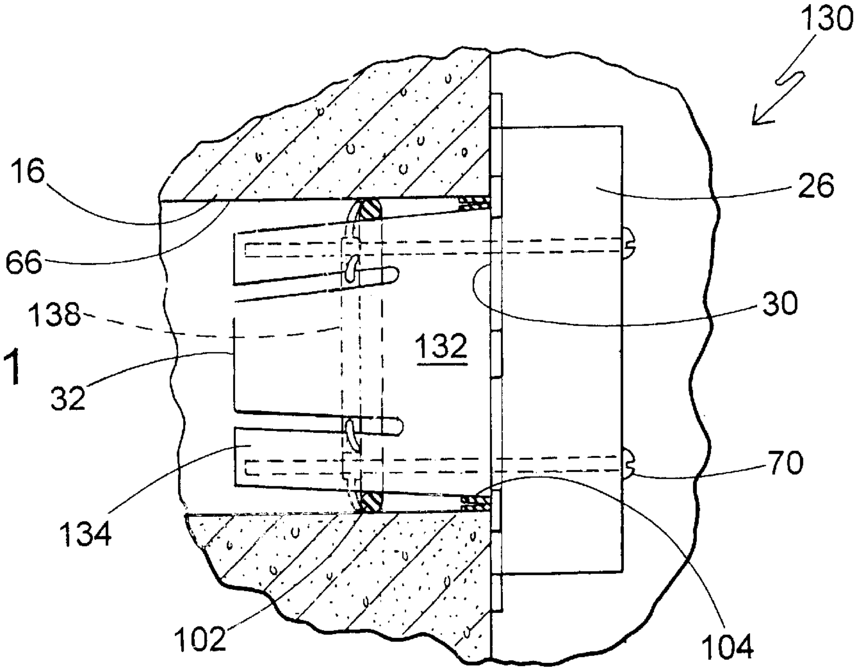
FIG. 11 is a side elevational view of the device of FIG. 10 shown in the locked position.

Referring now to FIGS. 10 and 11, the assembled device 130 is shown in an insertion position (FIG. 10) just after insertion of the device in the pipe and before it is secured or locked in place; and a locked position (FIG. 11) after the radially expanding engagement portion has been pulled toward the proximal end 30 to securely fasten the device 130 in the pipe 16. The relatively smaller diameter distal end 32 facilitates insertion, and the fasteners 70 are rotated to bring the spider member 138, and the captured O-ring 64, 102, toward the proximal end 30. As soon as the O-ring 64, 102 becomes wedged between the pipe 16 and the tubular body 134, the device 130 will become frictionally secured to the pipe. It will be appreciated, that, just as is the case with the devices 22 and 100, the device 130 is easily removable from the pipe 16 merely by backing out the fasteners 70, which will push the spider member 138 toward the distal end 32.

Figure 13:
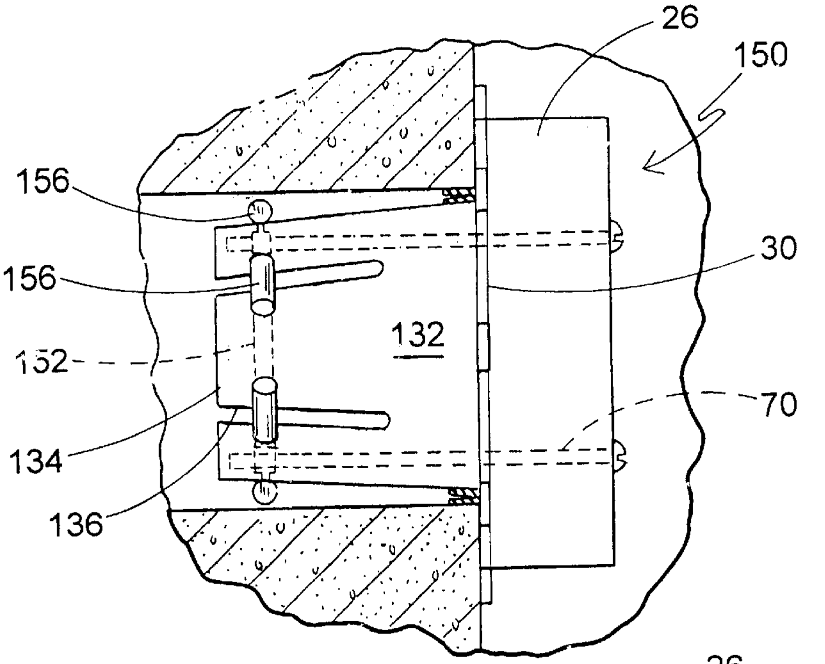
FIG. 13 is a side elevational view of a third alternate embodiment of the present device shown in an inserted position.
Figure 14:
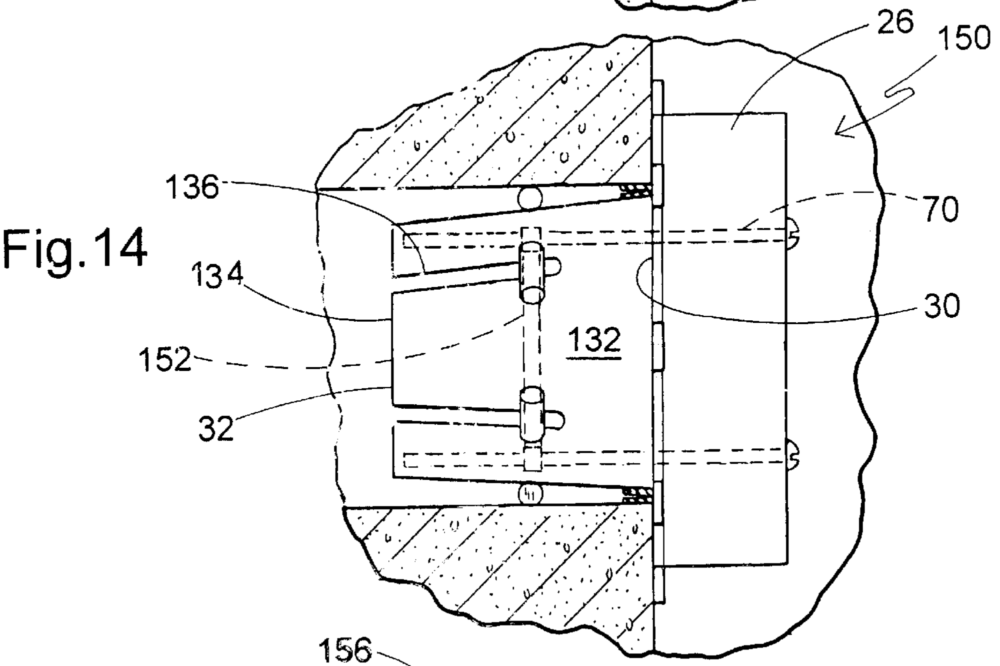
FIG. 14 is a side elevational view of the device of FIG. 13 shown in the locked position.
Figure 15:
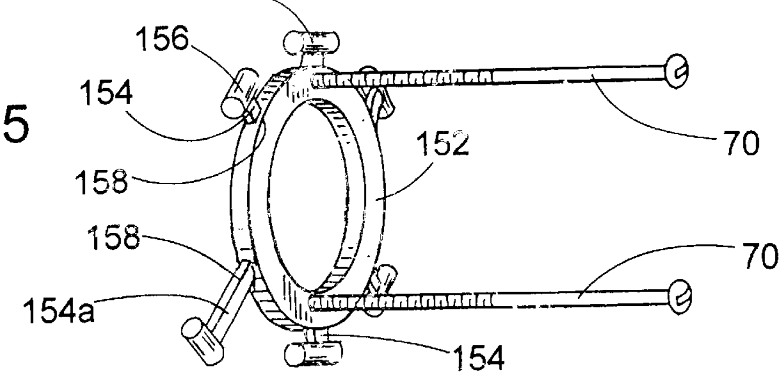
FIG. 15 is a perspective elevational view of a spider element for use with the device of FIG. 13.

Referring now to FIGS. 13–15, a third alternate embodiment of the present device is generally designated 150, and components which are shared with the devices 22, 100 and 130 are identified with identical reference numbers. The device 150 is substantially identical to the device 130, with the exception of the spider member 152. Instead of a separate O-ring 64, 102, the spider member 152 is provided with a plurality of radially extending arm portions 154, each of which is constructed and arranged to project through a corresponding slot 136, and at least one of said arm portions is provided with a resilient wedge member 156. As is the case with the device 130, the number and configuration of the slots 136 and the arm portions 154 may vary depending on the application.

In the preferred embodiment, the wedge member 156 is a segment of resilient rubber or foam and is configured for providing a wedged friction fit between the inner surface 66 of the pipe 16 and the tubular body 134. As is the case with the fingers 144, the radial arms 154 are dimensioned to slide forward the slots 136 toward the proximal end 30 with prematurely engaging the inner surface 66. However, once the wedge members 156 are securely wedged between the inner surface of the pipe 16 and the tubular body 134, the device 150 is securely positioned in the pipe as are the other devices 22, 100 and 130.

In the embodiment 150, it is especially preferred that the arms 154 are long enough to clear the tubular body 134, yet not too long so that they will hang up on the inside surface 66 of the pipe 16 prior to obtaining a tight engagement. An alternate length of the arm 154 is shown at 154*a*. To this end, the arms 154 are preferably provided with a hinged attachment joint 158 to the ring 152. In the preferred embodiment the hinged joint takes the form of an integrally molded living hinge, as is well known in the art. However, alternate known hinge configurations are contemplated, provided they meet strength and corrosion resistance requirements.

Figure 16:
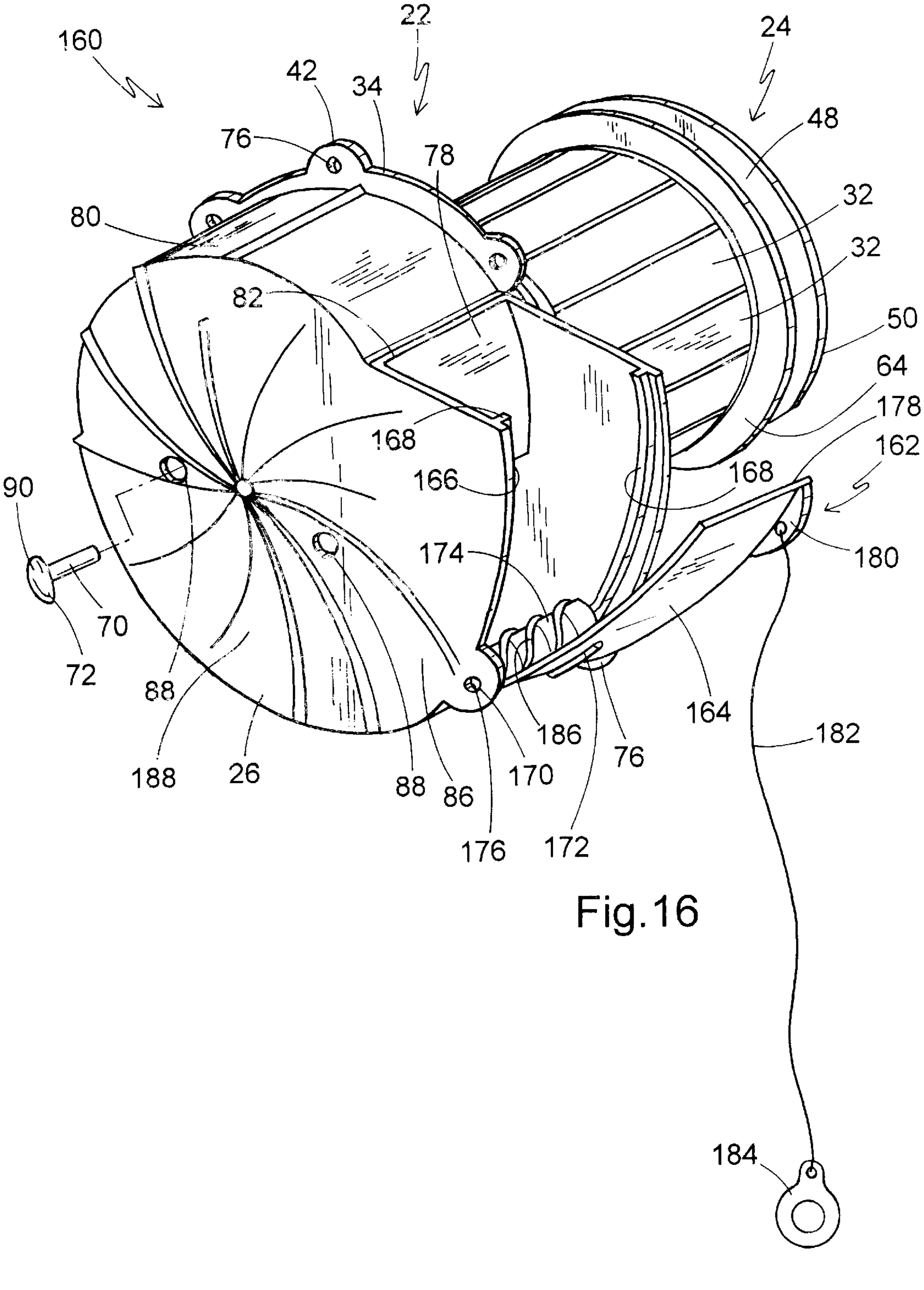
FIG. 16 is a perspective view of an alternate embodiment of the device of FIG. 1.

Referring now to FIG. 16, yet another alternate embodiment of the device 22 is shown and generally designated 160. Components shared with the embodiment 22 have been designated with identical reference numbers. The distinguishing feature of the device 160 is that it is provided with a clog release mechanism, generally designated 162. It has been found that, in some cases, debris carried by the flow of water into the sewer system 14, 16 may become caught or wedged in the device 22. While a main function of the device 22 and the other embodiments described above is to temporarily retard the flow of water into the pipe 16, the presence of debris is considered undesirable. Among other problems, the debris creates unwanted obstruction to water flow through the device 22.

Thus, in function, the clog release mechanism 160 is configured to temporarily create a relatively unobstructed path for water through the device 160 and into the sewer pipe 16. This is accomplished by temporarily increasing the dimensions of the water flow path through the unit 160. The result is that the increased flow through the unit will flush away any debris. Alternatively, if the debris has totally clogged the unit 160, the mechanism 162 will allow the pipe 14 to be drained of standing water to that the unit may be accessed by a service person to manually clear the clog.

In the preferred version of this embodiment, the release mechanism 162 takes the form of a hinged door 164 which is basically cut out from the sidewall 80 of the cowl 26. It is important that the door 164 be dimensioned so that it creates an opening below the end of the vane portion 82 (seen in FIG. 4). By creating an access from the exterior of the cowl 26 to the opening 38 (FIG. 6), debris caught by the vane 82 will be more readily flushed from the interior of the cowl and/or standing water in the pipe 14 may be drained off to facilitate service access to the unit 160. However, it is preferred that the clog release mechanism 162 provide for remote actuation so that service personnel do not have to climb into the sewer pipe 14 to clear the clog or to reset the device 160 for use.

The presence of the door 164 creates an opening 166 bordered by the cowl 26 and the flange 34. A pair of generally arcuate door stops 168 are preferably molded into opposing portions of the cowl 26 and the flange 34 to create a stop for the door 164. The stops 168 also create a seal point for the closed door, so that incoming water cannot bypass the vane 82 during normal operation. The head pressure or force of incoming water will also press the door 164 against the stops 168, enhancing this sealing relationship. Also, a hinge point 170 is created at a hinge end 172 of the door, and employs a pair of the existing adjacent eyelets 76 and 42. An additional eyelet 173 is provided on an outer edge of the sidewall 80. A tubular hinge boss 174 is preferably molded to the hinge end 172 to support an elongated hinge pin 176 or threaded fastener. It is also contemplated that the hinge boss may be formed in a piano hinge style, with alternating boss segments formed on the cowl sidewall 80 and on the hinge end 172 of the door 164.

A free end 178 of the door 164 is preferably provided with an eyelet 180 to which is attached a tether cord, lanyard or wire 182 having a loop or handle 184. It is contemplated that, for this embodiment, the device 160 will be situated in the sewer pipe 16 so that the inlet 78 faces down, or in other words, the unit 22 is rotated 180° from that shown in FIGS. 2–4. This orientation has in some cases been found to reduce clogging. As such, by pulling up on the cord 182, the door 164 is pulled open to release trapped debris. It is also contemplated that the cord 182 will be of sufficient length that the handle 184 is accessible by a user located on the ground or street level. Thus, clogs can be alleviated without having to climb into the water-filled sewer 14.

Once the clog is relieved and any trapped water flows down the sewer pipes 14, 16, the door 164 is preferably biased to return to the closed position where it engages the stops 168. The biasing force is preferably provided by a spring 186, which in the embodiment 160 is coiled around or incorporated into the hinge boss 174. It is contemplated that the type and/or orientation of the spring 186 may vary to suit the application.

It is also contemplated that the location of the door 164 may change to suit the application, such as being located on an outer face 188 of the cowl 26, or elsewhere on the sidewall 80, or moving radially inward instead of outward, or a section of the sidewall is movable radially inward, as long as the vane portion 82 is bypassed. Other contemplated alternatives are that the cowl 26 is temporarily released from engagement with the flange 34 to temporarily increase the water flow through the unit 160.

In operation, the storm sewer overflow control device 22, 100, 130, 150, 160 may be installed assembled or in component form and assembled on site. If preassembled, the cowl 26 is secured to the flange 34. The engagement portion 24 is inserted into the pipe with the inlet 78 facing downward, until the flange 34 abuts the wall of the storm drain 14 (best seen in FIG. 1). Although the inlet 78 is shown in the present FIGS. 1–4 as facing upward, it has been found that in that position, the inlet becomes easily clogged with tree branches, leaves and other debris. The V-seal 104 creates a water-tight seal between the device 22, 100, 130 150 and the pipe 16. Next, the installer places the appropriate driving tool, such as a nut driver or a screwdriver, preferably of the powered variety, into engagement with the head 72 of each of the fasteners 70. Preferably, the fastener heads 72 are accessed from outside the cover panel 86 as depicted in FIG. 3. As the fasteners 70 are rotated clockwise, the wedge ring 50 or the spider members 138, 152 will be drawn toward the flange 34. In this manner, the slats 28, the O-ring 64, 102 or the resilient wedge members 156 are radially expanded to tightly engage the inside surface 66 of the pipe 16. In some cases, a sealing relationship is facilitated by the O-rings 64, 102 which are compressed against the interior of the pipe 16. Once the radial expansion is sufficient to tightly frictionally secure the device 22, 100, 130, 150, 160 within the pipe, the device becomes more difficult to remove from the pipe by axially pulling on the flow control portion 26. It has been found that this increased holding force is provided in part by movement of the distal ring 102 toward the distal end 32 as the radial expansion occurs, particularly in the embodiments 22 and 100.

If the device 22, 100, 130, 150, 160 is provided unassembled, the engagement portion 24 may be inserted into the pipe 16 as described above, and the cowl 26 fastened to the flange on site by inserting fasteners into the mating eyelets 42, 76. Expansion is achieved as described above in relation to the preassembled device. However, the fastener heads 72 may be accessed prior to attaching the cowl 26 by engaging the heads on the flange surface 74.

In the event that the device 22, 100, 130, 150,160 becomes clogged with debris, or must be repaired, the operator has a choice of whether to employ the biased clog release mechanism 162 or, how much of the device 22, etc. to disassemble. If desired, only the cowl 26 need be removed by removing the fasteners from the eyelets 42, 76. Alternatively, the entire device 22, 100, 130, 150, 160 may be removed by unscrewing the fasteners 70. This operation radially retracts the slats 28 and the O-rings 64, or the O-ring 102 or the resilient wedge members 156 so that the device 22, 100, 130, 150, 160 can be withdrawn from the pipe 16. An advantage of the present invention is that by using plastic components for the cowl 26 and the engagement portion 24, even if the fasteners 70 become corroded they can still be removed, unlike conventional stainless steel vortex units.

Thus, it will be seen that a lightweight, easy to assemble and disassemble storm sewer overflow control device has been provided. Many sizes and conditions of pipes can be accommodated, and a tight, sealing fit can be achieved without the use of heavy equipment. The relatively light weight of the present device 22 makes installation easy, even under the cramped conditions in a pipe. Existing pipes should not be damaged during installation of the present device 22, 100, 130, 150, 160 thus minimizing the time and expense of providing storm sewer overflow control, as opposed to conventional devices.

While a particular embodiment of the storm sewer overflow control device of the invention has been shown and described, it will be appreciated by those skilled in the art that changes and modifications may be made thereto without departing from the invention in its broader aspects and as set forth in the following claims.

What is claimed is:

1. A storm sewer overflow control device for controlling runoff surge flows from a first pipe into a generally normally oriented second pipe, comprising:

an engagement portion configured for insertion into the second pipe;

a flow control portion attachable to said engagement portion and configured for receiving runoff surge flow flowing down the storm drain and slowing the flow for entry into the second pipe through said engagement portion;

said flow control portion including a cowl attachable to a flange and having a sidewall defining an inlet;

said engagement portion having a proximal end and a distal end, and at least one component being radially expandable to create a friction fit against an interior surface of the second pipe for retaining said engagement portion in the second pipe;

clog release means for releasing debris trapped between said flow control portion and said engagement portion, said clog release means includes at least one door formed in said sidewall, said door defining an opening bordered by said cowl and said flange for temporarily increasing the flow of water through said device.

2. The device as defined in claim 1 wherein said engagement portion is configured to expand radially as it is shortened axially.

3. The device as defined in claim 2 wherein said engagement portion includes a plurality of spaced, generally parallel slats each having proximal and distal ends, said proximal ends being joined to a flange, said device further including a wedge ring, said distal ends engaging said wedge ring.

4. The device as defined in claim 3 further including an expander mechanism attached to said wedge ring, said wedge ring engages inner surfaces of said slats, said expander mechanism being configured for pulling said wedge ring toward said flange to push said slats radially against an inner surface of the second pipe.

5. The device as defined in claim 4 wherein said expander mechanism includes at least one fastener with a distal end engaging said wedge ring, and a proximal end accessible near said flange so that rotation of said fastener causes said wedge ring to move toward said flange.

6. The device as defined in claim 5 wherein said proximal end of said fastener is accessible through said flow control portion.

7. The device as defined in claim 1 further including at least one annular resilient ring configured to circumscribe said engagement portion.

8. The device as defined in claim 7 further including a pair of said rings, one located closer to said distal end, the other located closer to said proximal end for preventing water from entering the second pipe and bypassing the flow control portion.

9. The device as defined in claim 8 wherein said ring closer to said proximal end is a V-seal having an open end and a pointed end, wherein said pointed end is directed toward said distal end and said open end flares when subjected to increasing water pressure, further increasing the sealing capabilities of said ring.

10. The device as defined in claim 9, wherein said V-seal has an angled outer wall portion and an inner wall which extends generally parallel to an axis of said engagement portion.

11. The device as defined in claim 10, wherein said outer wall has a peripheral edge which is oriented generally parallel to an axis of said engagement portion.

12. The device as defined in claim 8 wherein said ring closer to said distal end is a compressible ring having at least one flat side for engaging said engagement portion.

13. The device as defined in claim 12 wherein said ring includes a pair of radially spaced flat portions separated by a honeycomb portion.

14. The device as defined in claim 12 wherein said ring closest to said distal end has a plurality of radially extending gripping formations.

15. The device as defined in claim 1 wherein said at least one component which is radially expandable includes a spider member axially reciprocable relative to said engagement portion and being configured to exert a wedging clamping force upon a resilient ring as said spider member is moved toward said proximal end.

16. The device as defined in claim 1 wherein said clog release means is remotely operated.

17. The device as defined in claim 1 wherein said clog release door is biased to a closed position, said cowl includes a diverter vane and said door is located to define a flush flow path which circumvents said vane.

18. The device as defined in claim 17 further including a tethered handle secured to a free end of said release door for remote access.

19. The device as defined in claim 1 wherein said cowl has at least one diverter vane, said engagement portion defining a fluid conduit, said inlet being in fluid communication with said fluid passageway.

20. The device as defined in claim 19 wherein said engagement portion includes a flange, said cowl is releasably attachable to said flange.

21. The device as defined in claim 19 wherein said cowl is configured to restrict the amount of fluid entering said engagement portion.

22. A storm sewer overflow control device for controlling runoff surge flows from a first pipe into a generally normally oriented second pipe, comprising:

an engagement portion configured for insertion into the second pipe;

a flow control portion attachable to said engagement portion and configured for receiving runoff surge flow flowing down the storm drain and slowing the flow for entry into the second pipe through said engagement portion;

said engagement portion having a proximal end and a distal end, and at least one component being radially expandable to create a friction fit against an interior surface of the second pipe for retaining said engagement portion in the second pipe; and wherein said at least one component which is radially expandable includes a spider member axially reciprocable relative to said engagement portion and being configured to exert a wedging clamping force upon a resilient ring as said spider member is moved toward said proximal end.

23. The device as defined in claim 22 wherein said engagement portion is generally frusto conical and narrows toward said distal end, and said spider member has a plurality of radially extending arms configured for engaging said resilient ring and pushing said ring toward said proximal end to create a wedge fit for said engagement portion against the inside of the pipe.

24. The device as defined in claim 23 wherein engagement portion is generally conical in shape, narrows toward said distal end and has a plurality of spaced slots, said spider member is provided with a plurality of radially extending arm portions, each of which is constructed and arranged to project through a corresponding slot, and at least one of said arm portions is provided with a resilient wedge member.

25. The device as defined in claim 24 wherein said radially extending arm portions are hingedly attached to said spider member.

26. A storm sewer overflow control device for controlling runoff surge flows from a generally vertically oriented storm drain into a generally horizontally oriented storm sewer pipe, comprising:

an engagement portion configured for insertion into the storm sewer pipe to define a passageway and including a flange, said engagement portion having a plurality of slots having a longitudinal axis generally parallel with an axis of said engagement portion, spider ring dimensioned for reciprocal axial movement in said passageway and having a plurality of radially projecting arms;

a resilient wedge member configured for circumscribing said engagement portion;

a flow control portion attachable to said flange and defining a flow path configured for receiving runoff surge flow flowing down the storm drain and slowing the flow for entry into the storm sewer pipe; and an expander mechanism configured to draw said spider ring toward said flange to engage said wedge member and to pull said wedge member toward said proximal end to wedge said wedge member against the interior of the pipe.

27. A storm sewer overflow control device for controlling runoff surge flows from a generally vertically oriented storm drain into a generally horizontally oriented storm sewer pipe, comprising:

an engagement portion configured for insertion into the storm sewer pipe to define a passageway and including a flange, said engagement portion having a plurality of slots having a longitudinal axis generally parallel with an axis of said engagement portion, spider ring dimensioned for reciprocal axial movement in said passageway, a plurality of radially projecting arms;

a resilient wedge member configured for circumscribing said engagement portion;

a flow control portion attachable to said flange and defining a flow path configured for receiving runoff surge flow flowing down the storm drain and slowing the flow for entry into the storm sewer pipe; and an expander mechanism configured to draw said spider ring toward said flange to engage said wedge member and to pull said wedge member toward said proximal end to wedge said wedge member against the interior of the pipe.

28. The device as defined in claim 27 further including at least one annular V-seal disposed at said proximal end of said engagement portion for preventing water from entering the second pipe and bypassing said flow control portion.

* * * * *